United States Patent
Hemmer

(10) Patent No.: US 9,134,017 B2
(45) Date of Patent: *Sep. 15, 2015

(54) MODULAR, BYPASS TRACK AND CARRIAGE SYSTEM FOR OVERHEAD-MOUNTED LIGHTS AND OTHER DEVICES

(71) Applicant: Kavo Dental Technologies, LLC, Charlotte, NC (US)

(72) Inventor: Nathan Andrew Hemmer, Tualatin, OR (US)

(73) Assignee: KAVO DENTAL TECHNOLOGIES, LLC, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/600,485

(22) Filed: Jan. 20, 2015

(65) Prior Publication Data

US 2015/0129515 A1    May 14, 2015

Related U.S. Application Data

(63) Continuation of application No. 13/803,983, filed on Mar. 14, 2013, now Pat. No. 8,967,573.

(51) Int. Cl.
A47H 1/10 (2006.01)
F21V 21/35 (2006.01)
F21V 21/03 (2006.01)

(52) U.S. Cl.
CPC ............... *F21V 21/35* (2013.01); *F21V 21/03* (2013.01)

(58) Field of Classification Search
CPC ...... A61B 6/4464; A61B 6/56; F16M 11/425; F16M 13/027; B65G 17/20; F21V 21/34; F21W 131/20; Y10S 362/804

USPC ........ 211/162; 248/317, 323, 298.1; 362/804, 362/249.09; 378/197

See application file for complete search history.

(56) References Cited

U.S. PATENT DOCUMENTS 958,269 A     5/1910  McCanse
2,633,088 A   3/1953  King
2,905,806 A   9/1959  Tunney (Continued)

FOREIGN PATENT DOCUMENTS

DE      19653507     6/1998
WO      WO 02065932   8/2002
WO      WO 2011006230 1/2011

OTHER PUBLICATIONS

Hello Trade, "Humanscale M7 Dual Wall or Track Mounted Monitor Arm", <http://www.hellotrade.com/media-control-usa/humanscale-m7-dual-wall-or-track-mounted-monitor-arm.html>, website available as early as Jul. 22, 2001.

(Continued)

*Primary Examiner* — Bradley Duckworth
(74) *Attorney, Agent, or Firm* — Michael Best & Friedrich LLP

(57) ABSTRACT

A track and carriage system including a mounting plate, a first track secured to the mounting plate and receiving a first carriage movable therein, a second track secured to the mounting plate and receiving a second carriage movable therein. The first and second tracks are positioned substantially parallel to one another such that the carriage of the first track moves independently of and in parallel with the carriage of the second track.

17 Claims, 8 Drawing Sheets

(56) References Cited

U.S. PATENT DOCUMENTS

| | | |
|---|---|---|
| 3,240,925 A | 3/1966 | Paschke et al. |
| 3,373,285 A | 3/1968 | Barrett |
| 3,399,856 A | 9/1968 | Pecaut |
| 3,973,504 A | 8/1976 | Knudsen |
| 4,109,305 A | 8/1978 | Claussen et al. |
| 4,625,731 A | 12/1986 | Quedens et al. |
| 4,863,133 A | 9/1989 | Bonnell |
| 4,868,845 A | 9/1989 | Koropp |
| 5,375,049 A | 12/1994 | Witt |
| 5,533,090 A | 7/1996 | Nyzen |
| 5,618,090 A | 4/1997 | Montague et al. |
| 5,664,957 A | 9/1997 | Starr |
| 6,286,794 B1 | 9/2001 | Harbin |
| 6,364,268 B1 | 4/2002 | Metelski |
| 6,431,515 B1 | 8/2002 | Gampe et al. |
| 6,431,751 B1 | 8/2002 | Everett et al. |
| 6,568,836 B2 | 5/2003 | Wahl |
| 6,639,623 B2 | 10/2003 | Howell et al. |
| 6,659,415 B2 | 12/2003 | Kummerfeld et al. |
| 7,178,469 B2 | 2/2007 | Goza |
| 7,410,138 B2 | 8/2008 | Parsons |
| 7,440,548 B2 | 10/2008 | Molz et al. |
| 7,641,391 B2 | 1/2010 | Schwieker |
| 7,828,852 B2 | 11/2010 | Bonutti |
| 8,128,041 B2 | 3/2012 | Parsons |
| 8,154,859 B2 | 4/2012 | Shahrokhi |
| 8,553,842 B2 | 10/2013 | Moon et al. |
| 8,755,492 B2 | 6/2014 | Lee et al. |
| 2003/0160142 A1 | 8/2003 | Brahler et al. |
| 2004/0155167 A1 | 8/2004 | Carter |
| 2009/0256044 A1 | 10/2009 | Miller et al. |
| 2012/0207274 A1 | 8/2012 | Yang et al. |
| 2014/0034802 A1 | 2/2014 | Robbins |

OTHER PUBLICATIONS

ICW Solid Support "LCD Mounts", <http://www.icwusa.com/>, website available as early as Jan. 25, 1999.

Marus, "Track Light Owners Manual" (2012) 92353. Rev 4, 29 pages.

Pelton and Crane, "Flex Arm Monitor Mount Installation Instructions Use and Care" (2008) 054159 Rev. 5, 39 pages.

KLS Martin Group, "Ceiling-Mounting Systems" (2008) 90-305-02-05, 12 pages.

DCI Equipment, "Operatory Lights" publicly available before Mar. 14, 2013, pp. 12-13.

Manfrotto, "Sky Track System" publicly available before Mar. 14, 2013, pp. 82-99.

Dental EZ Alabama, Inc., "aXcs Operatory Light Installation, Operation and Care Manual" (2003) P.N. 2717-196D, 30 pages.

Igus, <www.igus.com> website available as early as Dec. 24, 1997.

MODULAR, BYPASS TRACK AND CARRIAGE SYSTEM FOR OVERHEAD-MOUNTED LIGHTS AND OTHER DEVICES

CROSS-REFERENCE TO RELATED APPLICATIONS

The present patent application is a continuation of U.S. patent application Ser. No. 13/803,983, filed Mar. 14, 2013, the entire contents of which are hereby incorporated by reference.

BACKGROUND

The present invention relates to mounting systems for overhead lights and devices. More specifically, the invention relates to a modular track and carriage system that has multiple tracks secured adjacent to one another on a mounting plate. The system is capable of suspending, powering, and connecting multiple devices, one each for translation along its respective track.

SUMMARY

Track lighting and other ceiling-mounted lighting systems are, in general, known. However, most ceiling-mounted lighting and tool systems, particularly systems used in dental examination and operating rooms, have a number of deficiencies. One deficiency of many current systems is that it is difficult and sometimes impossible to mount more than a single track on the ceiling in the space that is available. In many cases, the number of devices that may be mounted on a ceiling is restricted on a one-to-one basis to the number of tracks, particularly if it is important that the devices not interfere with each other when being moved across the ceiling. So, if only a single track can be mounted on the ceiling, only one light or other device can be mounted at a time if unobstructed movement is desired.

Certain embodiments of the system provide a modular system in which multiple tracks can be mounted adjacent one another in a relatively small footprint so as to permit the multiple devices on the ceiling to move in a manner so that the devices bypass each other when they are moved across the ceiling. In one embodiment, the invention provides a track and carriage system including a mounting plate. The mounting plate is configured to be fixed or otherwise secured to a ceiling. The mounting plate is also configured to removably position a first track adjacent to and substantially parallel to a second track. A first carriage is received within and movable along the first track and a second carriage is received within and movable along the second track. The first and second carriages move independently of and in parallel to one another.

In another embodiment, the invention provides a track and carriage system for securing a plurality of translatable devices. The system includes a mounting plate. The system also includes a first track having an elongate, bearing wall, a first side wall having a length, and a second side wall having a length. The first and second side walls are oriented generally parallel to each other and define a space therebetween. A carriage having a body, which includes a top surface and a bottom surface, is configured to fit within and is slidable along the lengths of the first and second side walls. The system further includes a second track having an elongate, bearing wall, a first side wall having a length, and a second side wall having a length. The first and second side walls are oriented generally parallel to each other and define a space therebetween. A carriage having a body, which includes a top surface and a bottom surface, is configured to fit within and is slidable along the lengths of the first and second side walls. The carriage of the first track is configured to slide independently of and in parallel with the carriage of the second track. The first track and the second track are removably and independently secured to the mounting plate.

In another embodiment, the invention provides a track and carriage system that includes a track having an elongate, bearing wall, a first side wall having a length, and a second side wall having a length such that the first and second side walls are oriented generally parallel to each other and define a space therebetween. The system further includes a carriage having a body. The body has a top surface and a bottom surface. The body is also configured to fit within and is slidable along the lengths of the first and second side walls. The system also includes an umbilical holder disposed between the top surface of the carriage and the bearing wall and is configured to fit within the first and second side walls. The umbilical holder is configured to guide a cable.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
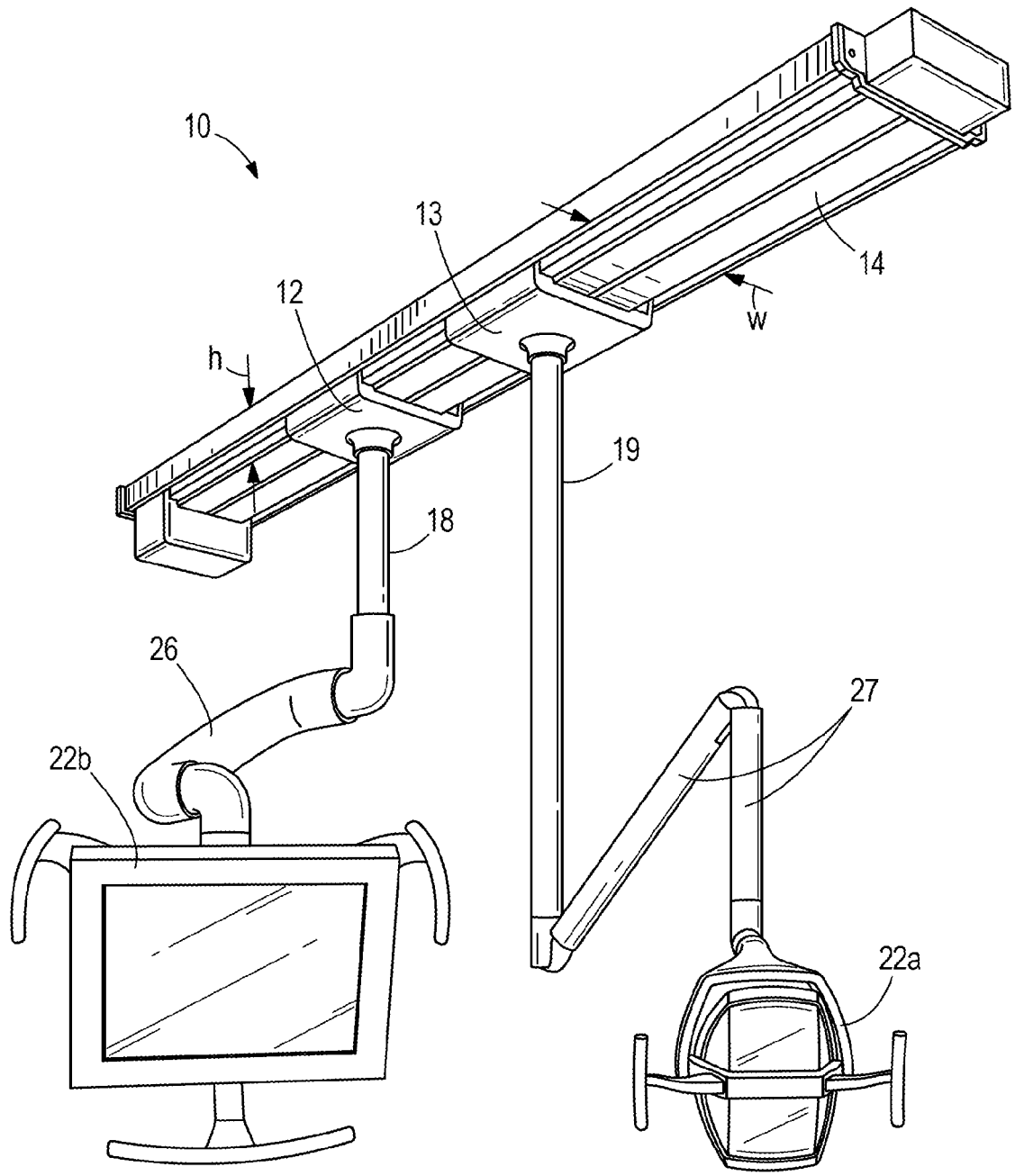
FIG. 1 illustrates a prior-art track and carriage system for overhead-mounted devices.

FIG. 1 illustrates a conventional track and carriage system 10 including first and second carriages 12, 13. The carriages 12, 13 are movable along a single track 14. The first and second carriages 12, 13 support mounting posts 18, 19. Each mounting post 18, 19 receives and supports a device 22a, 22b (i.e., a light, a monitor, an x-ray machine, or the like) for evaluating and treating patients in a dental treatment, operating room, or similar room. Since each carriage 12, 13 is positioned in the single track 14, it is impossible for the carriages 12, 13 to pass each other. In other words, the carriages 12, 13 are collinear with respect to one another. The posts 18, 19, which may be connected to one or more support arms 26, 27, allow the devices to rotate 360° about the posts such that they may each be manipulated into a variety of positions.

As illustrated in FIG. 1, the track 14 has a width w and a height h. The conventional track and carriage system 10 has several disadvantages. First, the movement of the devices 22a, 22b is limited because the collinear carriages are not able to pass one another along the track 14. Second, the track and carriage system 10 manages the electrical components (i.e., electrical cable, etc.) for both devices 22a, 22b. This shared management of electrical components makes installation, removable, and maintenance of devices 22a, 22b difficult. Further, the track 14 is only capable of supporting a limited number of devices without severely limiting translation of the devices along the track 14. Most often, in order to add additional devices to the system 10, one of the existing devices must be removed and then replaced with a desired device. Additionally, the track 14 is relatively wide. As a consequence, the track consumes a relatively large amount of available ceiling space. This makes adding other tracks difficult as there may not be additional space. Even if space is available, the addition of other tracks may require reconfiguration of the examination room.

Figure 2:
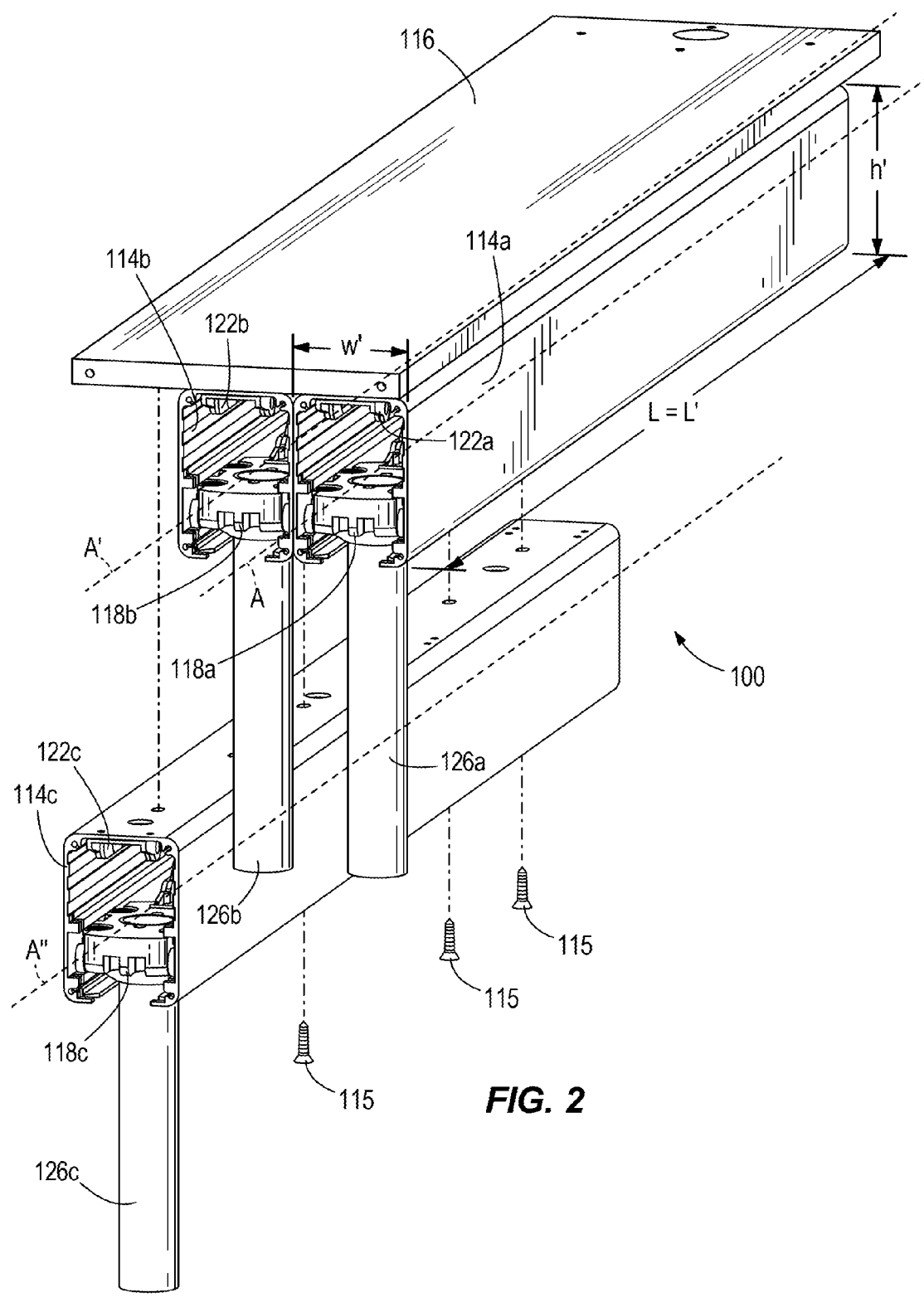
FIG. 2 illustrates a perspective, partially exploded view of a track and carriage system including multiple independent tracks secured to a mounting plate according to one embodiment of the invention.

FIG. 2 illustrates a modular track and carriage system 100 including multiple independent tracks 114a-114c secured to a mounting plate or platform 116 according to one embodiment of the invention. The system 100 may include multiple tracks 114a-114c, which are described in greater detail below. Each of the tracks 114a-114c is independently and removably installed by securing (e.g., by fasteners 115) the tracks 114a-114c to the mounting plate 116. The plate 116 is secured to the ceiling of an examination space or room. The tracks 114a-114c may be positioned adjacent and substantially parallel to one another on the mounting plate 116 to suspend, power, and manipulate multiple devices.

With further reference to FIG. 2, the track and carriage system 100 includes a first track 114a removably and independently secured to the mounting plate 116. A first carriage 118a is movable along the first track 114a. A first umbilical holder 122a is disposed on a top surface of the first carriage 118a and is movable within the first track 114a to guide a first cable (not shown).

The system 100 further includes a second track 114b removably and independently secured to the mounting plate 116 and a second carriage 118b movable along the second track 114b. A second umbilical holder 122b is disposed on a top surface of the second carriage 118b and is movable within the second track 114b to guide a second cable (not shown).

The system 100 may also include a third track 114c removably and independently secured to the mounting plate 116 and a third carriage 118c movable along the third track 114c. A third umbilical holder 122c is disposed on a top surface of the third carriage 118c and is movable within the third track 114c to guide a third cable (not shown).

Figure 3:
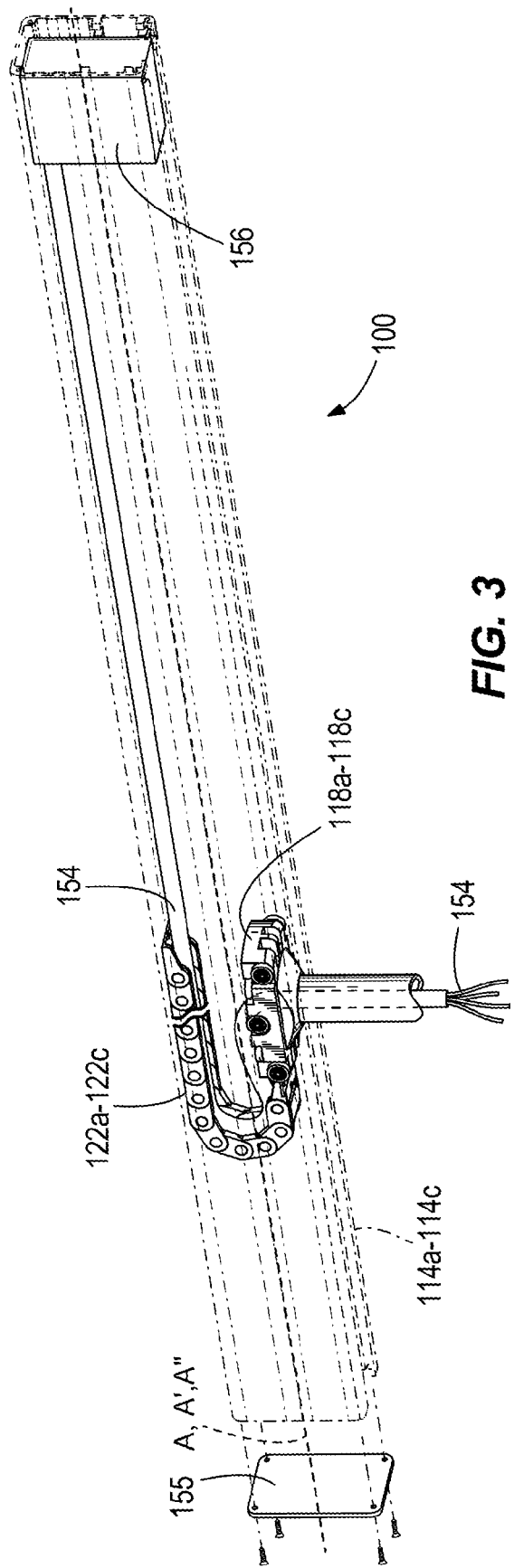
FIG. 3 illustrates an exploded view of one of the tracks of FIG. 2 including the carriage, umbilical holder, and mounting post.
Figure 4:
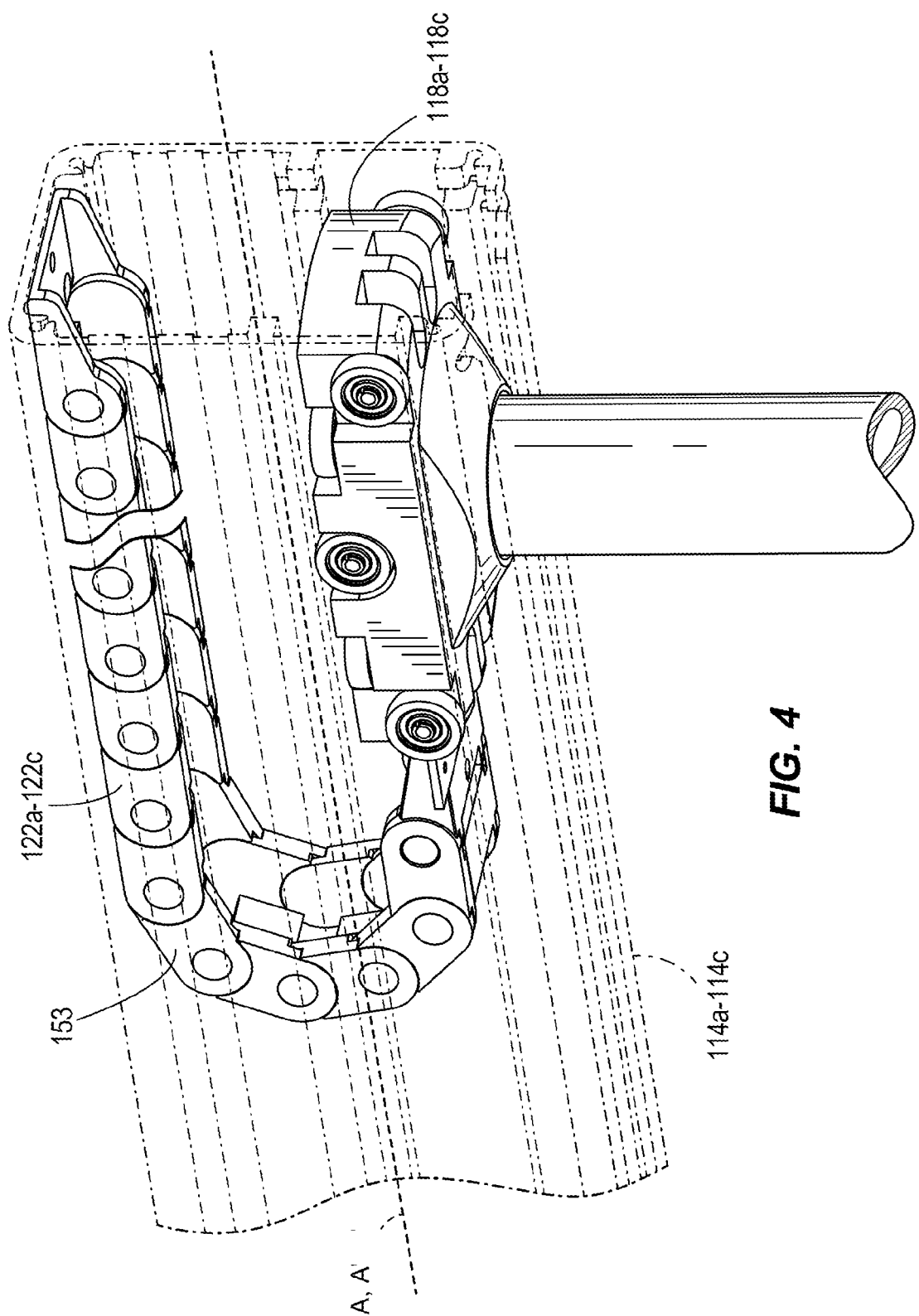
FIG. 4 illustrates a close-up, perspective view of the tracks of FIG. 3 including the carriage, umbilical holder, and mounting post.
Figure 5:
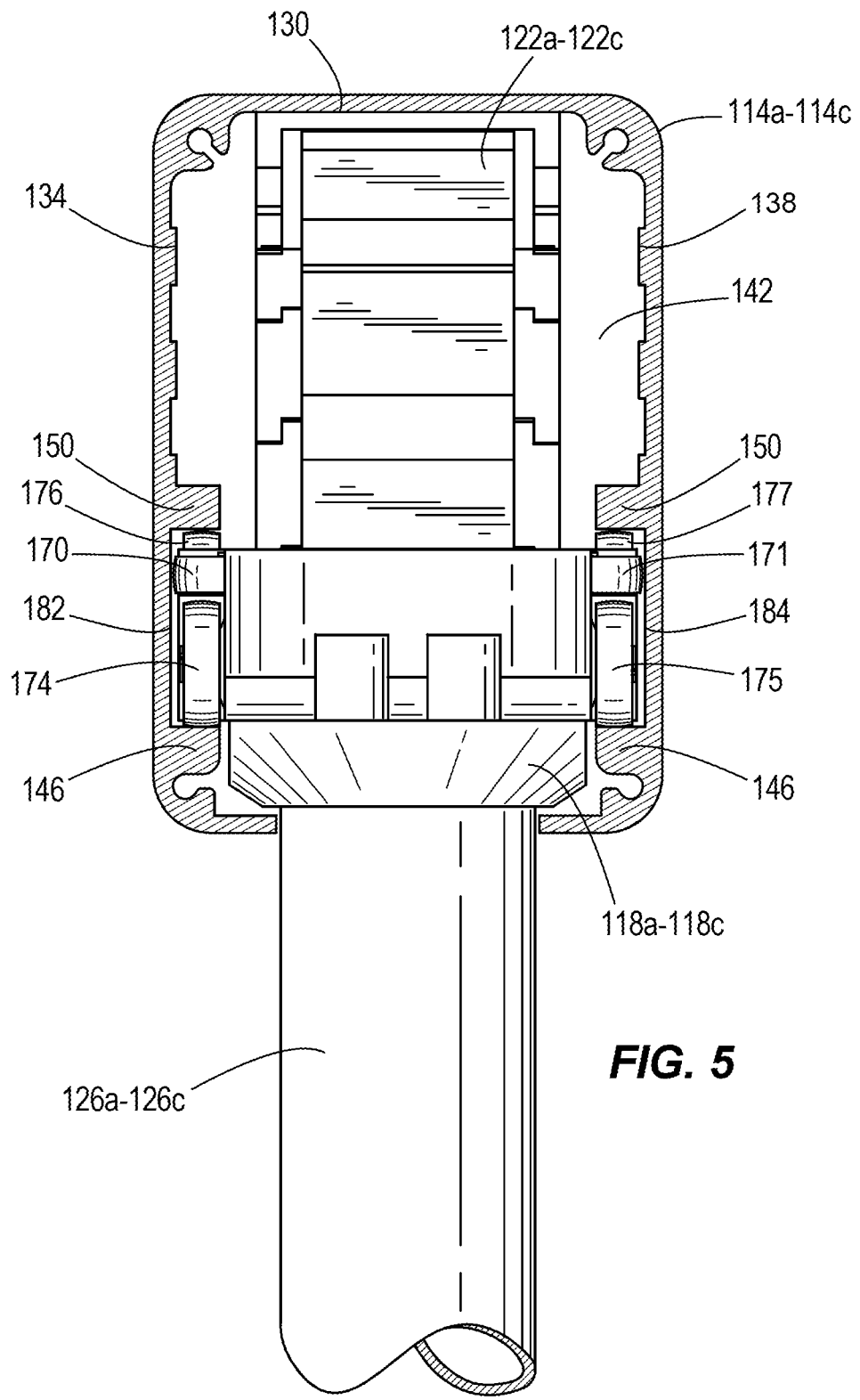
FIG. 5 illustrates a front view of the track, carriage, umbilical holder, and mounting post of FIG. 3.
Figure 6:
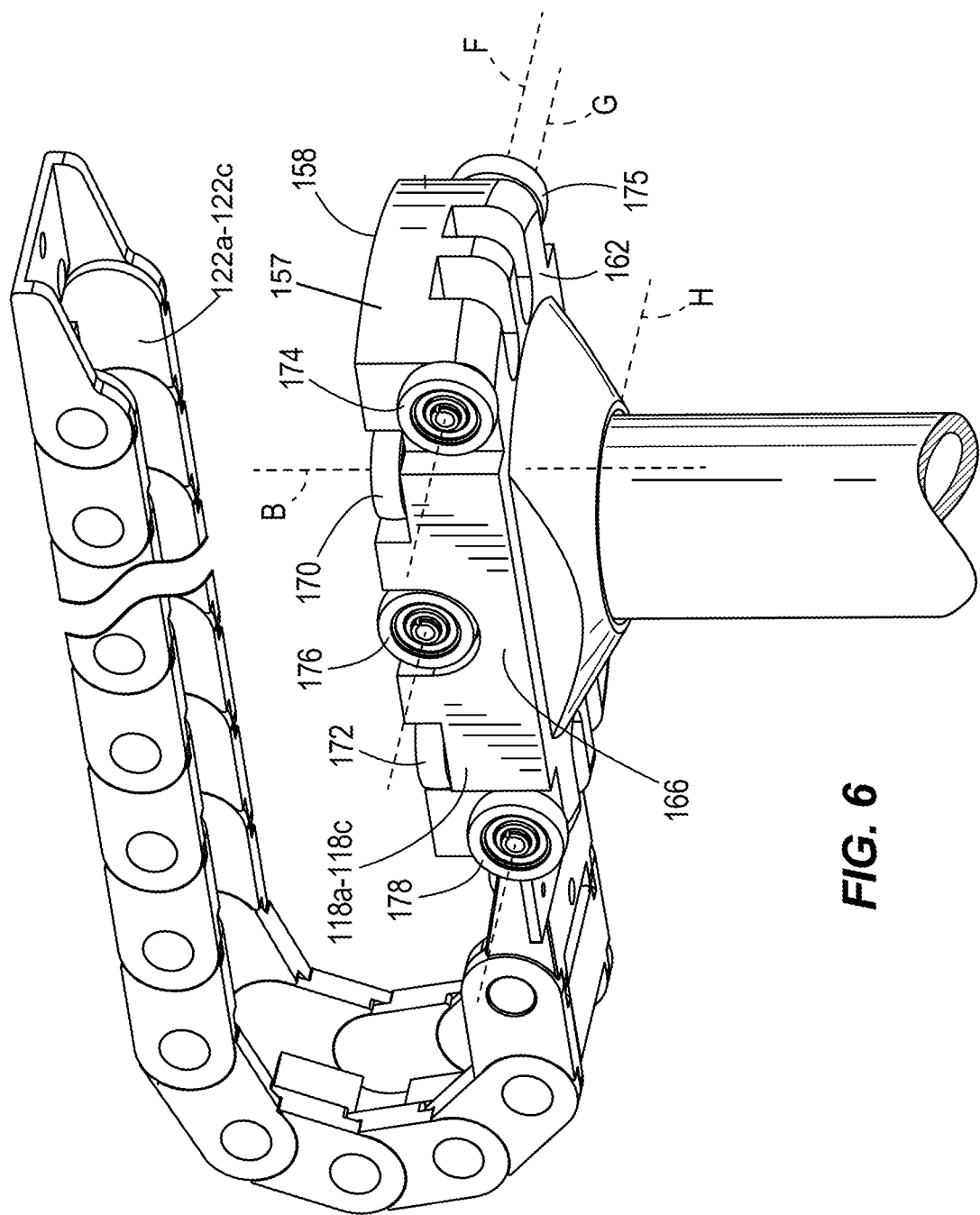
FIG. 6 illustrates a perspective view of the carriage of FIG. 3 relative to the umbilical holder, which are secured by the track (not shown).
Figure 7:
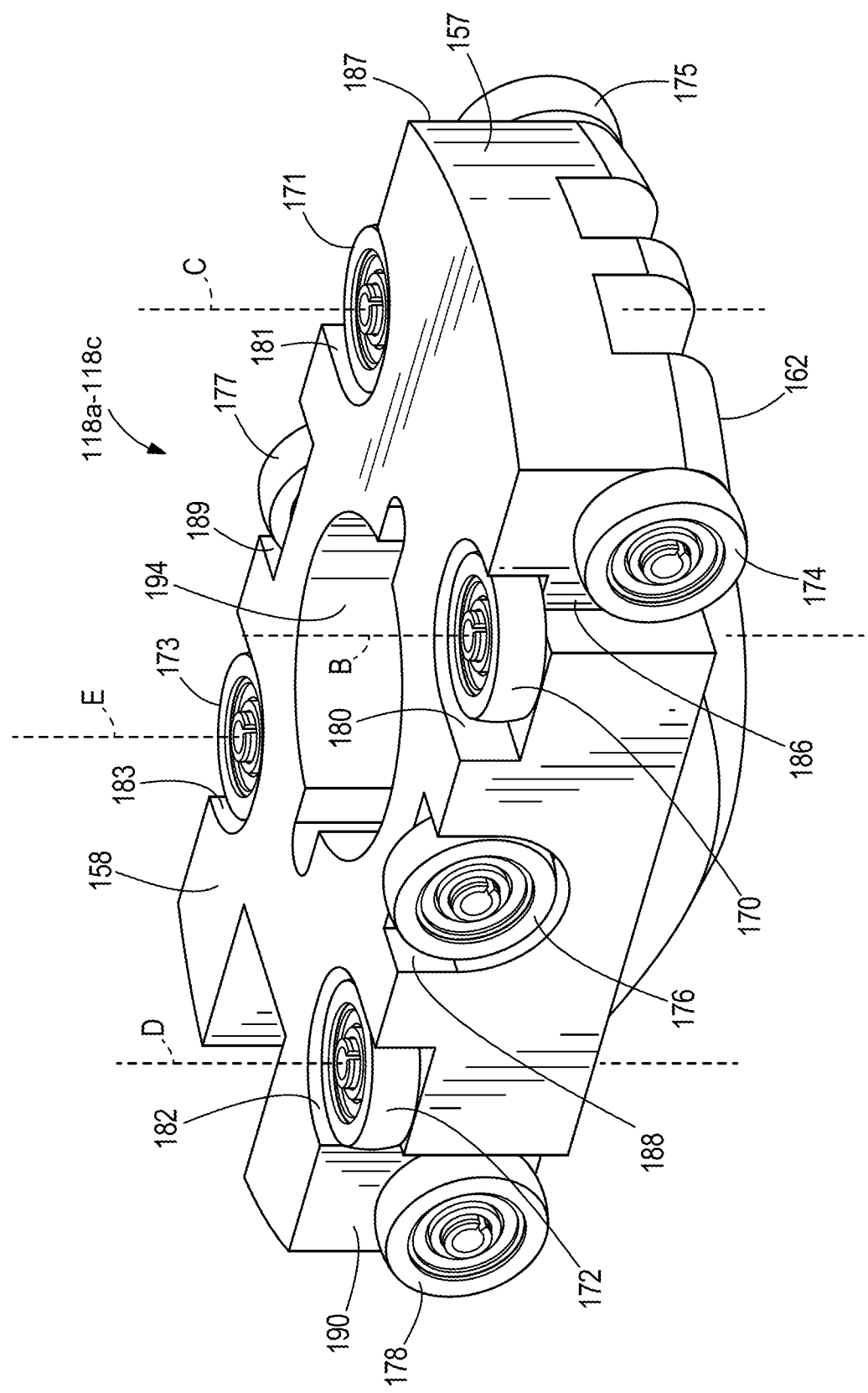
FIGS. 7 and 8 illustrate perspective views of the carriage of FIG. 3.
Figure 8:
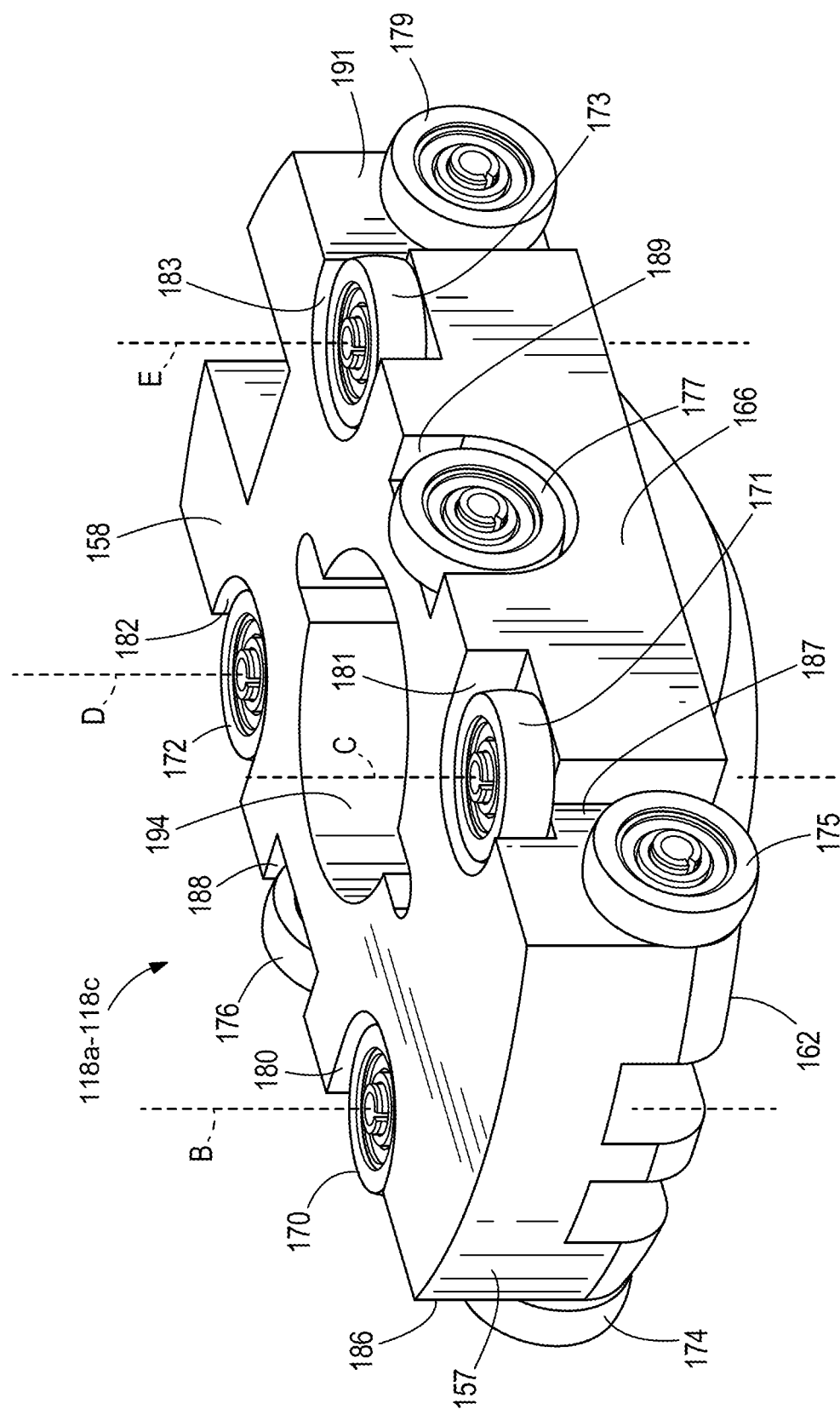

A mounting post 126a, 126b, 126c is received and secured within an aperture 194 (FIGS. 7 and 8) in each of the carriages 118a, 118b, 118c. Each of the mounting posts 126a, 126b, 126c is configured to secure a device (not shown). Also, each of the first, second, and third tracks 114a-114c supports an independent power supply connection, network connection, or combined connection 156 (FIG. 3). The connection may include, for example, power outlets, network ports, and the like to supply power and communications to devices secured to the mounting posts.

The first, second, and third tracks 114a-114c are removably and independently secured to the mounting plate 116. The first and second tracks 114a, 114b are positioned adjacent and substantially parallel to one another such that the carriage 118a and, therefore, the umbilical holder 122a and device, of the first track 114a move independently of and in parallel with the carriage 118b and, therefore, the umbilical holder 122b and device of the second track 114b. The third track 114c is positioned adjacent and substantially parallel to the first and second tracks 114a, 114b. The carriage 118c and, therefore, the umbilical holder 122c and device of the third track 114c move independently of and in parallel with the carriage 118a, 118b and, therefore, the umbilical holders 112a, 122b and devices, of the first and second tracks 114a, 114b.

The system 100 is designed to reduce the disadvantages of conventional track and carriage systems discussed above with respect to FIG. 1. In the embodiment shown, the tracks are identical to each other, the carriages are identical to each other, and the umbilical holders are identical to each other. Thus, a combination of a track, a carriage, and an umbilical holder forms a standardized unit and provides for modularity of the system 100. However, it is not essential for each module to be exactly identical to the others. For example, some variation in the tracks, carriages, umbilical holders, and other components is within the scope of the invention. In the embodiment illustrated, the tracks 114a-114c are positioned in a side-by-side configuration, adjacent and substantially parallel to one another on the mounting plate 116. Each device is slidable, by way of one of the carriages 118a-118c, along the length of the corresponding track 114a-114c. In this embodiment, tracks 114a-114c each have a narrower width w' and a greater height h' than that of conventional track and carriage systems, such as the one illustrated in FIG. 1. The carriages 118a-118c and the umbilical holders 122a-122c are oriented vertically relative to one another in order to be self-contained within each respective track 114a-114c. This configuration maintains the cables and other components that enable functionality and translation of the devices within the confines of the track 114. Therefore, the multiple devices are afforded a wider range of positions for each device because they may bypass one another as they slide along the lengths of tracks 114a-114c. The narrow width w' of each track 114a-114c allows multiple devices to be suspended from a space that is generally less than the space required by a conventional system. Additionally, the device supported by each system track 114a-114c is physically and electrically independent of the devices supported by adjacent tracks. Therefore, each track 114a-114c, and the components contained therein, may be installed, removed, and maintained independently. For example, in the illustrated embodiment, there are three independent tracks capable of supporting and translating three independent devices. Further embodiments may include more or fewer tracks and devices. As a consequence, as a practice grows or technological needs or preferences change, device management is easily facilitated because each device is suspended and connected independently.

FIGS. 2-5 illustrate the construction of the tracks 114a-114c according to one embodiment of the invention in greater detail. The tracks 114a-114c define parallel longitudinal axes A, A', A" (FIG. 2); the axes A, A', A" are parallel to one another when the tracks are secured to the mounting plate 116. The tracks 114a-114c each include an elongate, bearing wall 130, a first side wall 134, and a second side wall 138. The first side wall 134 has a length L and the second side wall 138 has a length L' (FIG. 2). The first and second side walls 134, 138 are oriented generally parallel to each other and define a space 142 therebetween. Each of the first and second side walls 134, 138 includes a first rib 146 and a second rib 150 that extend substantially the entire lengths L, L' of the first and second walls 134, 138. Each of the carriages 118a-118c, which are coupled to respective umbilical holders 122a-122c, is disposed between the first and second ribs 146, 150 and is configured to fit within and is slidable relative to the first and second side walls 134, 138. The umbilical holders 122a-122c are configured to fit within the first and second side walls 134, 138 and are disposed between the carriages 118a-118c and the bearing wall 130 of the respective track 114a-114c.

With reference to FIGS. 2-6, the umbilical holders 122a-122c guide electrical and network cabling (i.e., electrical cords and network cables, etc.) for powering and connecting the device. The umbilical holders 122a-122c each include a plurality of pivotally connected linkages 153. The linkages 153 define a cavity for receiving and guiding the cabling (represented by cord 154) as the carriage 118a-118c is moved along the length of the track 114a-114c. While the drawings illustrate the umbilical holder 122a-122c including pivotally connected linkages, it is contemplated that other constructions of umbilical holders are possible (i.e., umbilical holders having an integral construction). Some embodiments of the tracks 114a-114c may include end caps or covers 155 (FIG. 2) fixed to opposite ends of the tracks 114a-114c. The end caps enclose the carriages 118a-118c, umbilical holders 122a-122c, and electrical and network components within the tracks 114a-114c and may include the connection 156.

With reference to FIGS. 4-8, the carriages 118a-118c are configured to fit within and slide along the lengths L, L' of the first and second side walls 134, 138. Each carriage 118a-118c includes a body 157 having a top surface 158, a bottom surface 162, and first and second side surfaces 166. The carriages 118a-118c further include a plurality of horizontal wheels 170-173 and a plurality of vertical wheels 174-179.

The plurality of horizontal wheels 170-173 are located within recesses 180-183 in the top surface 158. The horizontal wheels 170-173 are rotatable about vertical axes B, C, D, and E, respectively. The axes B-E are parallel to one another and are perpendicular to the longitudinal axis of the track 114a-114c. The horizontal wheels 170-173 are configured to extend beyond side surfaces 166 of the carriage 118a-118c. The horizontal wheels 170, 172 can (for example, when subjected to a load) maintain contact with an inner surface 182 of the first side wall 134, while the horizontal wheels 171, 173 similarly can maintain contact with an inner surface 184 of the second side wall 138 of the track 114a-114c.

The plurality of vertical wheels 174-179 are configured in pairs and located within recesses 186-191 in side surfaces 166. The vertical wheels 174, 175 are rotatable about horizontal axis F. The vertical wheels 176, 177 are rotatable about horizontal axis G, and the vertical wheels 178, 179 are rotatable about the horizontal axis H. The axes F, G, and H are parallel to one another and perpendicular to the longitudinal axis of the track 114a-114c. The vertical wheels 174, 175, 178, 179 are configured to extend beyond the bottom surface 162 in order to maintain contact with the first ribs 146, while the vertical wheels 176, 177 are configured to extend beyond the top surface 158 in order to maintain contact with the second ribs 150. In the illustrated embodiment, the pairs of vertical wheels are staggered relative to one another such that at least one vertical wheel extends beyond the top surface 158 and at least one vertical wheel extends beyond the bottom surface 162 on each side of the carriage 118a-118c. Further, embodiments may include horizontal and vertical wheels having different orientations relative to each other and to the carriage 118a-118c. The horizontal and vertical wheels enable the carriage 118a-118c, and therefore the umbilical holder 122a-122c, to slide or translate along the length of the track 114a-114c. The carriage 118a-118c includes the aperture 194 that receives and secures the mounting post 126a-126c therein for mounting a device (not shown).

Thus, the invention provides, among other things, a modular track and carriage system. The track and carriage system is capable of independently suspending, powering, and connecting a device for translation along a length of the track. The invention also provides the ability to install, remove, and maintain a plurality of tracks secured adjacent to and in parallel to one another. Each track and carriage supports a single device such that each device is powered and manipulated independently of one another. Various features and advantages of the invention are set forth in the following claims.

What is claimed is:

1. A track and carriage system, the system comprising:
 a mounting plate;
 a first track secured to the mounting plate;
 a first carriage movable along the first track;
 a second track secured to the mounting plate independently of the first track; and
 a second carriage movable along the second track;
 wherein the first and second tracks are positioned substantially parallel to one another and wherein the first carriage of the first track moves independently of and in parallel with the second carriage of the second track.

2. The track and carriage system of claim 1 further comprising:
 a first umbilical holder disposed on a top surface of the first carriage and movable within the first track to guide a first cable; and
 a second umbilical holder disposed on a top surface of the second carriage and movable within the second track to guide a second cable.

3. The track and carriage system of claim 2 wherein each of the first and second tracks supports a power supply, a network connection, or both a power supply and a network connection.

4. The track and carriage system of claim 2, wherein each of the first and second tracks includes an elongated bearing wall, a first side wall, a second wall side wall, and a space between the first and second side walls, the first side wall having a length oriented in parallel with a length of the second side wall.

5. The track and carriage system of claim 4, wherein each of the first and second side walls includes a first rib and a second rib, each of the first and second ribs extending substantially the entire lengths of the first and second walls.

6. The track and carriage system of claim 5, wherein each carriage is disposed between the first and second ribs of the corresponding track.

7. The track and carriage system of claim 6, wherein each carriage includes a plurality of horizontal wheels and a plurality of vertical wheels.

8. The track and carriage system of claim 7, wherein the plurality of horizontal wheels are located within recesses in the top surface, the horizontal wheels rotatable about axes perpendicular to a longitudinal axis of a body of the corresponding carriage and configured to extend beyond side surfaces of the corresponding carriage.

9. The track and carriage system of claim 7, wherein the plurality of vertical wheels are located within recesses in first and second side surfaces of the corresponding carriage, the vertical wheels rotatable about axes perpendicular to a longitudinal axis of a body of the corresponding carriage and staggered such that at least one wheel extends above the top surface and at least one wheel extends below a bottom surface.

10. The track and carriage system of claim 1 further comprising a mounting post received and secured within an aperture in each of the first and second carriages, each of the mounting posts configured to secure a device.

11. A track and carriage system of claim 1 further comprising:
a third track secured to the mounting plate;
a third carriage movable along the third track;
wherein the third track is positioned substantially parallel to the first and second tracks and wherein the third carriage of the third track moves independently of and in parallel with the first and second carriages of the first and second tracks.

12. The track and carriage system of claim 11 further comprising a third umbilical holder disposed on a top surface of the third carriage and movable within the third track to guide a third cable.

13. A track and carriage system for securing a plurality of translatable devices, the system comprising:
a mounting plate;
a first track including:
 an elongate, bearing wall, a first side wall having a length, and a second side wall having a length, the first and second side walls oriented generally parallel to each other and defining a space therebetween, and
 a carriage having a body configured to fit within and slidable along the lengths of the first and second side walls, the body including a top surface and a bottom surface; and a second track including:
 an elongate, bearing wall, a first side wall having a length, and a second side wall having a length, the first and second side walls oriented generally parallel to each other and defining a space therebetween, and
 a carriage having a body configured to fit within and slidable along the lengths of the first and second side walls, the body including a top surface and a bottom surface;
wherein the carriage of the first track is configured to slide independently of and in parallel with the carriage of the second track; and
wherein the first track and the second track are independently secured to the mounting plate.

14. The track and carriage system of claim 13 further comprising:
a first umbilical holder disposed on the top surface of the carriage of the first track and movable within the first track to guide a first cable; and
a second umbilical holder disposed on the top surface of the carriage of the second track and movable within the second track to guide a second cable.

15. The track and carriage system of claim 14 further comprising a third track including:
an elongate, bearing wall, a first side wall having a length, and a second side wall having a length, the first and second side walls oriented generally parallel to each other and defining a space therebetween; and
a carriage having a body configured to fit within and slidable along the lengths of the first and second side walls, the body including a top surface and a bottom surface;
wherein the carriage of the third track is configured to slide independently of and in parallel with the carriages of the first and second tracks; and wherein the third track is independently secured to the mounting plate.

16. The track and carriage system of claim 15 further comprising a third umbilical holder disposed on the top surface of the carriage of the first track and movable within the third track to guide a third cable.

17. A track and carriage system, the system comprising:
a mounting plate;
a first track secured to the mounting plate, the first track including an elongated bearing wall, a first side wall, a second side wall, and a space between the first and second side walls, the first side wall having a length oriented in parallel with a length of the second side, each of the first and second side walls including a first rib and a second rib, the first and second ribs extending substantially the entire lengths of the first and second side walls;
a first carriage movable along the first track and disposed between the first and second ribs of the first and second side walls, the first carriage including a plurality of horizontal wheels and a plurality of vertical wheels, the plurality of vertical wheels are located within recesses in first and second side surfaces of the first carriage, the plurality of vertical wheels are rotatable about axes perpendicular to a longitudinal axis of the body of the first carriage and are staggered such that at least one vertical wheel extends above a top surface of the first carriage and at least one vertical wheel extends below a bottom surface of the first carriage;
a first umbilical holder disposed on the top surface of the first carriage and movable within the first track to guide a first cable;
a second track secured to the mounting plate, the second track including an elongated bearing wall, a first side wall, a second side wall, and a space between the first and second side walls, the first wall having a length oriented in parallel with a length of the second side wall, each of the first and second side walls including a first rib and a second rib, the first and second ribs extending substantially the entire lengths of the first and second side walls;
a second carriage movable along the second track and disposed between the first and second ribs of the second track, the second carriage including a plurality of horizontal wheels and a plurality of vertical wheels, the plurality of vertical wheels located within recesses in first and second side surfaces of the second carriage, the plurality of vertical wheels rotatable about axes perpendicular to a longitudinal axis of the body of the second carriage and staggered such that at least one vertical wheel extends above a top surface of the second carriage and at least one vertical wheel extends below a bottom surface of the first carriage; and
a second umbilical holder disposed on the top surface of the second carriage and movable within the second track to guide a second cable,
wherein the first and second tracks are positioned substantially parallel to one another and wherein the first carriage in the first track moves independently of and in parallel with the second carriage in the second track.

* * * * *